No. 681,593. Patented Aug. 27, 1901.
W. H. TIPPIT.
NUT LOCK.
(Application filed Apr. 12, 1901.)
(No Model.)
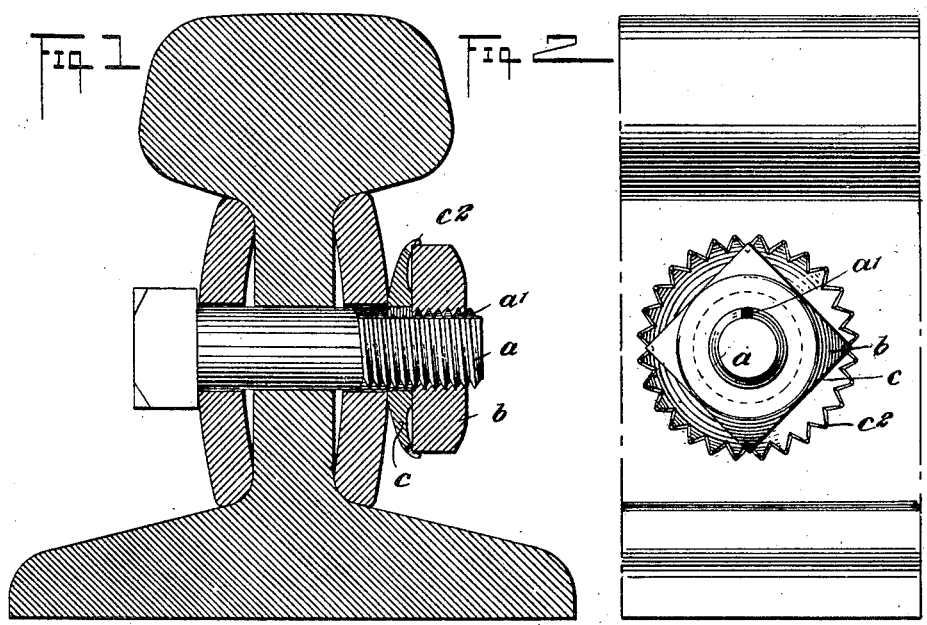
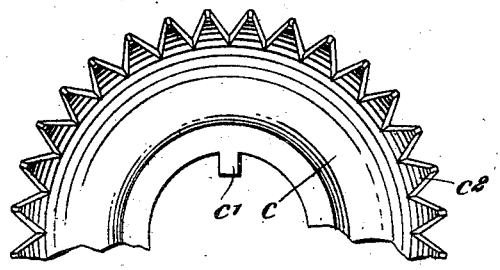
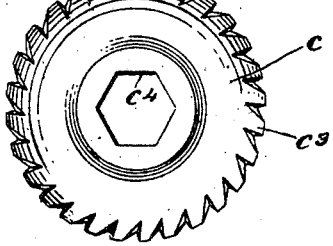
WITNESSES:
INVENTOR
William H. Tippit
BY
ATTORNEYS

UNITED STATES PATENT OFFICE.

WILLIAM H. TIPPIT, OF BLUFFS, ILLINOIS, ASSIGNOR OF ONE-FOURTH TO HARRY OAKES, OF SAME PLACE.

NUT-LOCK.

SPECIFICATION forming part of Letters Patent No. 681,593, dated August 27, 1901.

Application filed April 12, 1901. Serial No. 55,512. (No model.)

*To all whom it may concern:*

Be it known that I, WILLIAM H. TIPPIT, a citizen of the United States, and a resident of Bluffs, in the county of Scott and State of Illinois, have invented a new and Improved Nut-Lock, of which the following is a full, clear, and exact description.

This invention relates to a nut-lock comprising a peculiarly-formed disk adapted to have connection with a bolt, so that the disk cannot turn on the bolt, and also adapted to be engaged by the nut in such a manner as to hold the nut securely on the bolt.

This specification is a specific description of two forms of the invention, while the claim is a definition of the actual scope thereof.

Reference is to be had to the accompanying drawings, forming a part of this specification, in which similar characters of reference indicate corresponding parts in all the views.

Figure 1 is a sectional view of the invention. Fig. 2 is an elevation thereof. Fig. 3 is a fragmentary view of the disk shown in Figs. 1 and 2, and Fig. 4 is a view of a slight modification in the form of the disk.

I have shown my invention as applied to a railway-joint; but of course it is understood that the invention is useful in connection with all branches of mechanics.

$a$ indicates a bolt, which may be of any form desired, excepting that it is provided with a longitudinal groove $a'$, running along its threaded portion.

$b$ indicates the nut, which is of the usual form. The concavo-convex locking-disk $c$ has a central orifice for the reception of the bolt and a slight tongue $c'$, projecting into the orifice. This tongue is adapted to fit snugly within the groove $a'$, so that the disk $c$ cannot be turned on the bolt. The disk is free to move longitudinally, so that it may be placed on or displaced from the bolt. The disk $c$ is dished outward, so that its periphery will engage the base of the nut $b$, and this periphery is formed with a number of teeth $c^2$, which are adapted to engage the corners of the nut, as shown best in Fig. 2, and thus hold the nut from turning. The teeth $c^2$ may be of regular triangular form, as shown in Figs. 2 and 3, or they may be of ratchet-like form, as indicated at $c^3$ in Fig. 4. In place of the teeth $c^2$ or ratchets $c^3$ the edge of the rim may be crimped, if desired. Also, if desired, the disk $c$ may be secured on the bolt by means other than the tongue $c'$ and groove $a'$. For example, the disk may be formed with a hexagonal or other angular opening, as indicated at $c^4$ in Fig. 4, such opening receiving a correspondingly-shaped portion of the bolt. I have not illustrated a bolt so formed in the drawings, since the intended construction will be readily understood.

In screwing up the nut tightly against the disk the corners of the nut will lock with the teeth on the periphery thereof, and this will hold the nut. The disk acts effectively on the nut, owing to the form of the disk and the manner in which it is mounted on the bolt, the concavo-convex shape serving in a certain degree to lap the periphery of the disk over the nut, so as to secure effective engagement therewith.

Various changes in the form, proportions, and minor details of my invention may be resorted to without departing from the spirit and scope of my invention. Hence I consider myself entitled to all such variations as may lie within the scope of my claim.

Having thus described my invention, I claim as new and desire to secure by Letters Patent—

The combination with a bolt and nut, of a concavo-convex disk having a central opening to receive the bolt, and provided with means for fastening it thereto to prevent the turning of the disk on the bolt, the entire periphery of the disk being formed with teeth or serrations with which engage the inner corners of the nut.

In testimony whereof I have signed my name to this specification in the presence of two subscribing witnesses.

WILLIAM H. TIPPIT.

Witnesses:
 HOMER ROCKWOOD,
 JOHN E. KORTY.